(12) United States Patent
Ringer et al.

(10) Patent No.: US 9,289,635 B2
(45) Date of Patent: Mar. 22, 2016

(54) DRY PIPE VALVE AND SYSTEM

(75) Inventors: Yoram Ringer, Providence, RI (US); James E. Golinveaux, N. Kingstown, RI (US)

(73) Assignee: Tyco Fire Products LP, Lansdale, PA (US)

( * ) Notice: Subject to any disclaimer, the term of this patent is extended or adjusted under 35 U.S.C. 154(b) by 200 days.

(21) Appl. No.: 13/981,873

(22) PCT Filed: Feb. 16, 2012

(86) PCT No.: PCT/US2012/025512
§ 371 (c)(1),
(2), (4) Date: Jul. 25, 2013

(87) PCT Pub. No.: WO2013/058819
PCT Pub. Date: Apr. 25, 2013

(65) Prior Publication Data
US 2013/0306333 A1    Nov. 21, 2013

Related U.S. Application Data

(60) Provisional application No. 61/443,691, filed on Feb. 16, 2011.

(51) Int. Cl.
*F16K 15/00* (2006.01)
*A62C 35/64* (2006.01)
(Continued)

(52) U.S. Cl.
CPC .............. *A62C 35/645* (2013.01); *A62C 35/62* (2013.01); *F16K 17/386* (2013.01); *F16K 31/122* (2013.01); *Y10T 137/0497* (2015.04); *Y10T 137/7877* (2015.04)

(58) Field of Classification Search
CPC .... A62C 35/62; A62C 35/645; F16K 31/122; F16K 17/386; Y10T 137/0497; Y10T 137/7877; Y10T 137/7876; Y10T 137/7909
See application file for complete search history.

(56) References Cited

U.S. PATENT DOCUMENTS 1,640,247 A * 8/1927 Olofsson et al. ................. 169/22
1,662,839 A * 3/1928 Tyden ............................. 169/22
(Continued)

FOREIGN PATENT DOCUMENTS

GB        999071 A  *  7/1965
GB        2045609       11/1980
(Continued)

OTHER PUBLICATIONS

International Searching Authority, International Search Report and Written Opinion issued in International Application No. PCT/US2012/025512, Jan. 24, 2013, 10 pages.
(Continued)

*Primary Examiner* — Jessica Cahill
(74) *Attorney, Agent, or Firm* — Perkins Coie LLP

(57) ABSTRACT

A differential control valve and method of operation as a residential dry pipe fluid control valve which provides for a high liquid to gas trip ratio. The valve includes a housing having an interior surface defining an internal chamber with a central axis. The valve further includes a first port; a second port and a third port, each in communication with the internal chamber. A first valve seat is disposed along the interior surface of the housing circumscribed about the central axis and a second valve seat is circumscribed about the first valve seat. A sealing member defines a sealed position and an open position with respect to the valve seats. A spring member biases the seal member toward the open position and is disposed between the sealing member and the interior of the housing.

12 Claims, 13 Drawing Sheets

(51) Int. Cl.
   *A62C 35/62* (2006.01)
   *F16K 17/38* (2006.01)
   *F16K 31/122* (2006.01)

(56) References Cited

U.S. PATENT DOCUMENTS

| | | | | |
|---|---|---|---|---|
| 1,866,319 | A * | 7/1932 | Peckham | 169/22 |
| 3,292,709 | A * | 12/1966 | Hodgman, Jr. | 169/21 |
| 4,286,668 | A * | 9/1981 | McCormick | 169/22 |
| 4,552,221 | A * | 11/1985 | Klein | 169/22 |
| 5,099,925 | A * | 3/1992 | Glidden et al. | 169/17 |
| 6,068,057 | A * | 5/2000 | Beukema | 169/22 |
| 6,557,645 | B1 * | 5/2003 | Ringer | 169/22 |
| 7,814,983 | B2 | 10/2010 | Ringer | |
| 2006/0021765 | A1 | 2/2006 | Golinveaux | |
| 2008/0277125 | A1 | 11/2008 | Wilkins et al. | |
| 2009/0199916 | A1 * | 8/2009 | Kozdras et al. | 137/625.29 |
| 2014/0182865 | A1 * | 7/2014 | Ringer | 169/46 |

FOREIGN PATENT DOCUMENTS

| | | |
|---|---|---|
| WO | WO 9312840 A1 * | 7/1993 |
| WO | WO 99/59679 | 11/1999 |

OTHER PUBLICATIONS

U.S. Appl. No. 61/443,691, filed Feb. 16, 2011. 100 pages.

* cited by examiner

DRY PIPE VALVE AND SYSTEM

PRIORITY DATA AND INCORPORATION BY REFERENCE

This application is a 35 U.S.C. §371 application of International Application No. PCT/US2012/025512, filed Feb. 16, 2012, which claims the benefit of priority to U.S. Provisional Patent Application No. 61/443,691, filed Feb. 16, 2011, each of which is incorporated by reference in its entirety.

TECHNICAL FIELD

This invention relates generally to fluid control valves and more particularly to a differential control valve for use in a residential fire protection system as a dry pipe control valve.

BACKGROUND ART

An automatic sprinkler system is one of the most widely used devices for fire protection. These systems have sprinklers that are activated once the ambient temperature in an environment, such as a room or a building, exceeds a predetermined value. Once activated, the sprinklers distribute fire-extinguishing fluid, preferably water, in the room or building. A fire sprinkler system, depending on its specified configuration, is considered effective if it controls or suppresses a fire.

The sprinkler system can be provided with a water supply (e.g., a reservoir or a municipal water supply). Such supply may be separate from that used by a fire department. Regardless of the type of supply, the sprinkler system is provided with a main that enters the building to supply a riser. Connected at the riser are valves, meters, and, preferably, an alarm to sound when the system activates. Downstream of the riser, a usually horizontally disposed array of pipes extends throughout the fire compartment in the building. Other risers may feed distribution networks to systems in adjacent fire compartments. The sprinkler system can be provided in various configurations. In a wet-pipe system, used for example, in buildings having heated spaces for piping branch lines, all the system pipes contain a fire-fighting liquid, such as, water for immediate release through any sprinkler that is activated. In a dry-pipe system, used for example, in unheated areas, areas exposed to freezing, or areas where water leakage or unintended water discharge is normally undesirable or unacceptable such as, for example a residential occupancy, the pipes, risers, and feed mains, branch lines and other distribution pipes of the fire protection system may contain a dry gas (air or nitrogen or mixtures thereof) under pressure when the system is in a stand-by or unactuated condition. A valve is used to separate the pipes that contain the water. When heat from a fire activates a sprinkler, the gas escapes from the branch lines and the dry-pipe valve trips or actuates; water enters branch lines; and fire fighting begins as the sprinkler distributes the water.

There are patent publications which describe the control and monitor of dry type residential fire sprinkler protection systems. For example, U.S. Patent Publication No. 20080277125; U.S. patent application Ser. No. 11/916,419, entitled "Releasing Control Unit for Residential Fire Protection System," which is incorporated herein by reference in its entirety.

U.S. Patent Publication No. 20080277125 describes an electronically operated solenoid fluid control valve for separation of the dry and wet portions of the fire protection system. It may be desirable to have a mechanically operated control valve option or alternative, in which for example, the pressure of gas in the dry sprinkler piping holds the control valve in closed state against an inlet of liquid (water) pressure. One type of mechanically operated dry pipe control valve is shown and described in U.S. Pat. No. 7,814,983 (the '983 patent). The dry pipe valve of the '983 patent more specifically shows and describes a clapper that pivots about a pivot axis from a closed or sealed position against a valve seat to an open position angled away from the valve seat. The pivot-type valve is further described as having a valve arrangement in that can be maintained in a sealed, occluded or closed state when the ratio of inlet water pressure below the clapper to gas pressure above the clapper is at a minimum 5.5. Accordingly, the valve is tripped, actuated or operated when the ratio is less than 5.5.

DISCLOSURE OF INVENTION

Embodiments of the subject invention provide for preferred mechanically operated dry pipe valve arrangements and preferred performance. In particular, the embodiments described herein provide for a differential pressure control of fluid flow with one or more preferred operating characteristics, e.g., high liquid to sealing gas operating ratios and/or a low pressure drop across the valve when permitting fluid flow. In addition to providing for desired operating characteristics, the preferred valve arrangements provide for a control valve that is normally biased open and preferably provides for an alternate configuration to known mechanically pivot-type dry pipe valves. Particular preferred embodiments of the invention described herein provide for a sealed and/or trip ratio greater than 5.5 in a mechanically operated valve arrangement that provides for a preferably reduced assembly, in terms of size and/or weight, over known pivot-type operated control valves so as to provide for a dry pipe control valve and method of operation for use in a preferred dry pipe residential fire protection system.

Accordingly, one preferred embodiment of the invention provides for a differential control valve that includes a housing having an interior surface defining an internal chamber with a central axis; a first valve seat disposed along the interior surface of the housing and circumscribed about the central axis; and a second valve seat disposed along the interior surface disposed and circumscribed about the first valve seat. The preferred valve further includes a seal member defining a sealed position engaged with the first valve seat and the second valve seat, and an open position axially spaced from the first and second valve seats. The seal member is preferably substantially aligned with the central axis of the housing in each of the sealed and open positions. The valve also includes a first port proximate the first valve seat in communication with the internal chamber and a second port in communication with the internal chamber. The second port is preferably isolated from the first port when the sealing member is in the sealed position and in fluid communication with the first port when the sealing member is in the open position. The preferred fluid control valve also includes at least one spring member disposed between the interior surface of the housing and the seal member to bias the seal member toward the open position. More preferably, the at least one spring member is located between the first and second valve seats.

The preferred fluid control valve may include one or more of the following features additionally or in the alternative. For example, one embodiment of the fluid control valve provides that the spring member includes a coil spring having a first end engaged with the interior surface about the first valve seat and a second end engaged with a surface of the seal member that is opposed to the first valve seat. The spring member preferably tapers narrowly from the second end to the first end. Moreover, in one embodiment of the valve, the at least one spring member includes a plurality of coil springs. In one aspect of the preferred spring member, the spring member has a first length in the sealed position and a second length in the open position, the second length being greater than the first length. Alternatively, the at least one spring member has a first length in the sealed position and a second length in the open position, the second length being less than the first length. The preferred spring member preferably defines a total spring force ranging from about 8 to about 17 pounds-force (Lbs.-f) to bias the sealing member in the open position.

Another preferred aspect of the valve provides a third port between the first and second valve seats. When the seal member is in a sealed position, the seal member, the first and second valve seats define an annular void with the third port being in communication with the annular void. In yet another aspect of the preferred valve, the first valve seat defines a first fluid area to be sealed and the second valve seat defines a second fluid area to be sealed, in which the ratio of second fluid area to first fluid area is preferably 25 to 1. Preferably, in an embodiment in which each of the first and second valve seats are substantially circular, the first valve seat has a first diameter ranging from about ¾ inch to about one inch (1 in.) and the second valve seat has a second diameter of about five inches (5 in.). Moreover, the preferred valve arrangement defines a preferred liquid to gas trip ratio ranging from 6 to about 28, preferably ranging from about 14 to about 28 and is more preferably about 22. More particularly for one embodiment, the at least one spring member, sealing member and first and second valve seats define a trip ratio of liquid trip pressure in pounds per square inch (psi.) to gas trip pressure in pounds per square inch that ranges from 6 to 22.

In another preferred embodiment, the seal member is supported in the open position within the housing only by a frictional engagement with the spring member such that seal member is not supported by any other valve structure. Moreover, the seal member is centered about the central axis in the open position and the closed position. Preferably, the seal member comprises a substantially cylindrical member or assembly, having a first side and a second side opposite the first side. The first side of the seal member preferably includes a first seal portion for engagement with the first valve seat and a second seal portion for engagement with the second valve seat. In a preferred embodiment, the seal member includes a unitary gasket having the first and second seal portions. The unitary gasket is preferably disposed between a first plate and a second plate of the seal member. In another preferred aspect of the dry pipe fluid control valve, the valve further includes an elongated plunger member engaged with the housing with a portion disposed in the internal chamber. A preferred sealing member includes a receptacle for receiving the portion of the plunger to locate the seal member in sealed position. The preferred plunger member engages the sealing member to locate the sealing member against the liquid and gas valve seats; and is further preferably spaced from the sealing member in the sealed position and stand-by state of the control valve. In an alternate embodiment of the seal member, the second plate includes a projection element to center the seal member along the flow axis in which, the projection extends axially along the flow axis to cooperate with the valve housing.

In another aspect of the present invention, a preferred method of operating of a differential control valve is provided, in which the inlet of the valve defines a fluid flow axis and a seal element engages a fluid valve seat to define a sealed state and separates from the fluid valve seat to define an actuated state. The preferred method includes defining a first angular orientation between the seal element and the flow axis in the sealed state; and biasing the seal element in the actuated state with a spring member disposed between an interior surface of the valve and the seal member so as to define a second angular orientation between the seal element and the flow axis. The second angular orientation is preferably substantially the same as the first angular orientation. In one preferred aspect, defining the first angular orientation includes orienting a sealing surface of the seal element substantially perpendicular to the flow axis. In yet another preferred aspect of the method, biasing the sealing element in the actuated state includes locating an end of the spring member between a liquid valve seat and a gas valve seat.

Another preferred embodiment of the invention provides a residential fire protection system having a stand-by state and an actuated state defined or controlled by a preferred dry pipe fluid control valve. The preferred system includes a liquid supply piping system for supplying a liquid under a liquid pressure; and a residential sprinkler piping system filled with a gas under a gas pressure in the stand-by state of the system. The system further includes a differential fluid control valve for controlling the flow of liquid from the liquid supply piping system into the residential sprinkler piping system upon transition of the fire protection system from the stand-by state to the actuated state. The control valve preferably includes a housing having an interior surface defining an internal chamber with a central axis; a liquid valve seat disposed along the interior surface of the housing and centered about the central axis to define a liquid valve seat surface area; and a gas valve seat disposed along the interior surface, centered and circumscribed about the liquid valve seat to define a gas valve seat surface area. The valve further includes a seal member having a stand-by position engaged with the liquid valve seat and the gas valve seat; and an actuated position axially spaced from the liquid and gas valve seats. The seal member is preferably substantially aligned with the central axis of the housing in each of the stand-by and actuated positions. The preferred valve further includes a first port proximate the liquid valve seat and coupled to the liquid supply piping system to provide fluid communication between the liquid supply piping system and the internal chamber; and a second port coupled to the sprinkler piping system to provide fluid communication between the residential sprinkler piping system and the internal chamber. A spring member is provided to bias the seal member in the actuated position with a first end engaged with the interior surface of the housing and a second end engaged with the seal member.

In addition to the features of the preferred control valve described above, the preferred system and its control valve may, additionally or in the alternative, include one or more of the following features. In one aspect of the preferred system, wherein when the liquid pressure ranges from 30 psi. to 180 psi. against the second surface of the seal member, the residential fire protection system is maintained in the stand-by state with the gas pressure of the residential sprinkler piping ranging from greater than 2 psi. to about 25 psi., preferably ranging from about 8 psi. to about 25 psi.; more preferably ranging from about 10 psi. to about 15 psi. and preferably no more than about 14 psi., against the first surface to maintain the seal member in the stand-by position to define a minimum sealing pressure, and wherein when the gas pressure is below a minimum sealing pressure, the system is tripped into the actuated state with the seal member located in an actuated position such that the seal member is spaced from the gas valve seat and the liquid valve seat to provide a preferred liquid flow from the outlet of the valve ranging from 20 gallons per minute (gpm) to about 80 gpm at a head loss across the valve ranging from 2 psi. to about 20 psi. For a preferred embodiment of the system, the liquid valve seat surface area ranges from about 0.4 square inches to about 0.8 square inches; and the gas valve seat surface area is a minimum of about twenty square inches (20 sq. in.). Accordingly, in one embodiment, the gas valve seat is substantially circular defining a diameter of about five inches (5 in.) and the liquid valve seat is substantially circular defining a diameter ranging from about ¾ inch to about one inch (1 in.).

Preferably, the system is maintained in the stand-by state at a minimum pressure that ranges from greater than 6 psi to 25 psi. In a particular embodiment, the system provides at least one of the following: the liquid valve seat is substantially circular having a diameter of about ¾ inch; the residential sprinkler piping system including PVC pipe and fittings; and the gas pressure of the residential sprinkler piping maintaining the seal member in the first position being no more than 14 psi.

Another aspect of the present invention provides a method of operating of a differential control valve to control a flow of liquid at an inlet defining a flow axis. The method more preferably provides for operation of the valve in a residential fire protection system. The preferred method is applicable to the dry pipe fluid control valve and system described herein in addition to their various embodiments. The preferred valve has a seal element that engages a fluid valve seat to define a sealed state and separates from the fluid valve seat to define an actuated state. The preferred method includes establishing the stand-by state, which includes biasing the sealing member away from the liquid and gas valve seats with a liquid pressure ranging from 10 psi to 180 psi and more preferably ranging from about 30 psi. to about 180 psi.; and biasing the sealing member away from the liquid and gas valve seats with a spring element having a first end engaged with sealing member and a second end engaged with the internal surface. Establishing the preferred stand-by state includes engaging a plunging member with the sealing member to locate the sealing member against the liquid and gas valve seat; applying a gas pressure ranging from 6 psi. to 25 psi.; preferably ranging from about 8 psi. to about 25 psi.; more preferably ranging from about 10 psi. to about 15 psi, and preferably no more than about 14 psi. against the sealing member; and disengaging the plunging member from the sealing member. The preferred method further includes establishing the trip state which includes: applying a ratio of liquid trip pressure in pounds per square inch to gas trip pressure in pounds per square inch that ranges from about 6:1 to about 28:1: and more preferably from about 14:1 to about 22:1; and is even more preferably about 22:1.

BRIEF DESCRIPTIONS OF THE DRAWINGS

The accompanying drawings, which are incorporated herein and constitute part of this specification, illustrate exemplary embodiments of the invention, and, together with the description given above, serve to explain the features of the invention.

FIG. 1 a schematic of a preferred residential sprinkler system;

MODE(S) FOR CARRYING OUT THE INVENTION

Figure 1:
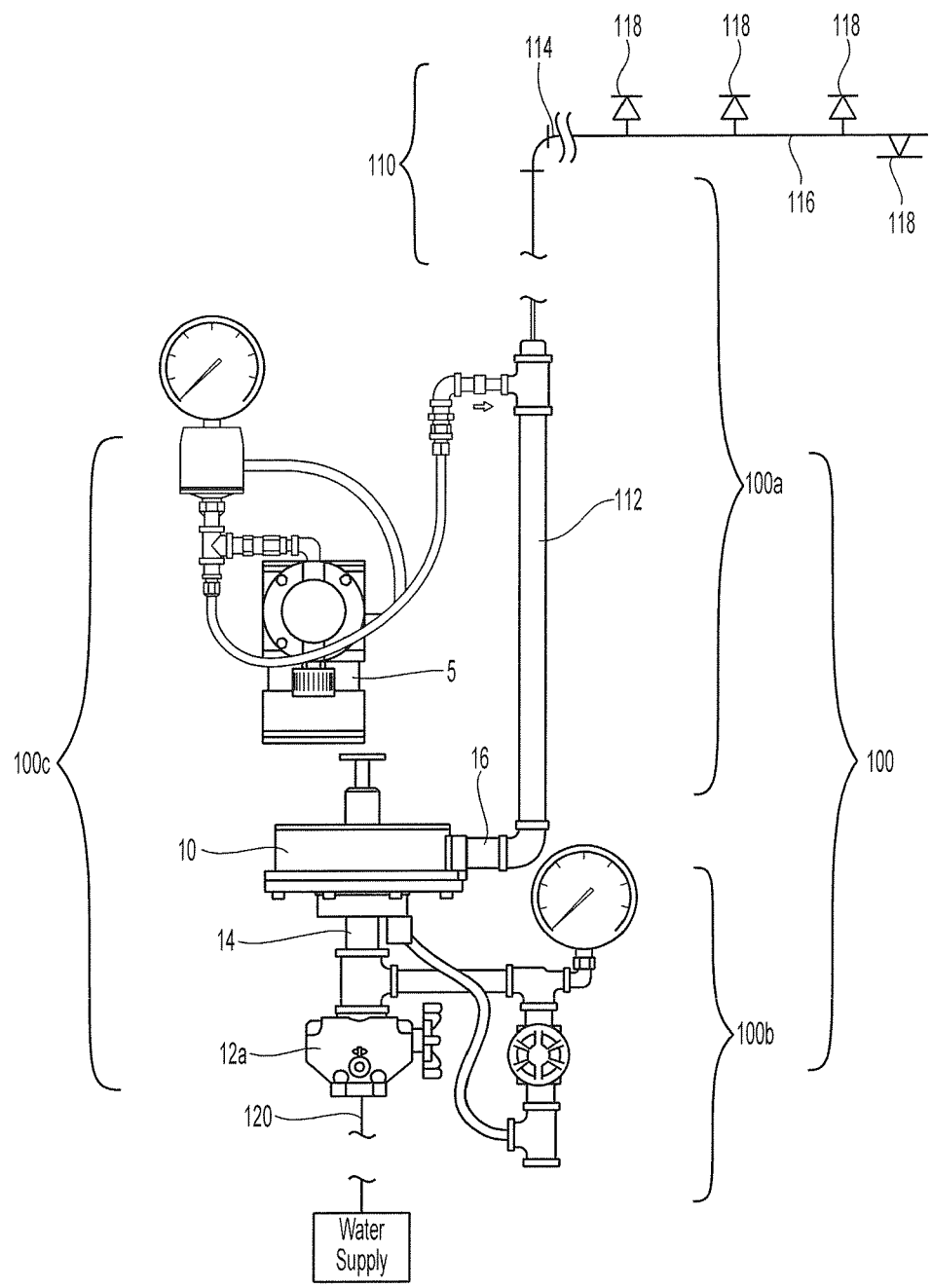

Shown in FIG. 1 is a schematic of a preferred embodiment of a dry pipe residential sprinkler system 100. The system 100 includes a dry portion 100a and a wet portion 100b. The dry portion 100a is defined by a residential sprinkler piping 110 which preferably includes a riser pipe 112, a cross main line 114 and one or more branch lines 116 each having one or more residential sprinklers 118 for protection of the residential occupancy. The wet portion 100b is defined by liquid supply piping 120 coupled to a liquid source such as, for example, a municipal water supply to provide a fire fighting liquid to the sprinklers.

The system 100 has a stand-by state and an actuated state. In the stand-by state, the dry portion 100a of the system is filled with a pressurized gas, such as for example, with compressed air. In the actuated state, such as for example, when one or more residential sprinklers 118 is actuated by a sufficient amount of heat from a fire, the pressurized gas is released from the actuated sprinkler and a fire fighting liquid is delivered from the wet portion 100b of the system to the dry portion of the system 100a and the one or more actuated sprinklers 118. The system 100 preferably includes a riser assembly 100c to place and maintain the system in its stand-by state. In particular, the riser assembly 100c preferably includes a compressed gas source 5 coupled to the main riser pipe 112 of the residential sprinkler piping 110. The preferred gas source is a mounted air compressor that can pressurize the sprinkler piping 110 to a pressure preferably ranging from 10 psi to about 25 psi., and more preferably about 10 psi to about 15 psi., and even more preferably to no more than 14 psi. Alternatively, the compressed gas may be supplied by a remotely located air compressor with compressed gas piping coupled to the riser pipe.

The riser assembly 100c further controls the supply of fire fighting fluid to the residential sprinkler. To provide the control, the preferred riser assembly 100c includes a differential control valve 10 isolated by a first shut off valve 12a upstream of the differential control valve and may include a second shut off valve 12b (not shown) downstream of the differential control valve. The first shut off valve 12a couples the fluid supply pipe to the differential control valve. More specifically, the control valve 10 includes an inlet port 14 coupled to and preferably axially aligned with the fluid supply pipe. The control valve 10 further includes an outlet port 16 coupled to the down stream residential sprinkler piping 110 and more particularly coupled to the main riser pipe which supplies the fire fighting fluid to the sprinklers 118. The control valve 10 includes a drain port 18 for venting fluid pressure, resetting the system 10 and/or providing for coupling to a fluid flow alarm.

In order to control the flow of fire fighting fluid, such as water, to the residential sprinkler piping 110, the control valve has a stand-by or sealed state in which the inlet port 14 is sealed preventing the flow of water from the outlet port 16 of the valve 10. The control valve 10 has an open or actuated state in which the inlet port 14 is open to permit the flow of water from the outlet port 16 to the residential sprinkler piping. As a differential control valve, the valve uses the pressurized gas of the dry portion 10a of the system 10 to seat a sealing element or member in the sealed state against the inlet liquid or water pressure. As detailed greater below, for the preferred control valve 10, the sealed state of the valve 10 preferably defines a low sealing gas pressure for a relatively high liquid pressure at the inlet of the valve. In particular, the preferred valve 10 may be maintained in a sealed state with a minimum sealing gas pressure of about 2 psi. for a minimum liquid pressure of about 30 psi., and a maximum sealing gas pressure of about 14 psi. for a maximum liquid pressure of about 175 psi. As further detailed greater below, the preferred valve has a high trip ratio defined by the ratio of a given liquid pressure at the inlet of the valve to a gas trip pressure that is less than the minimum sealing pressure. The trip ratio defines the fluid pressure relationship at which the valve trips or transitions from the sealed state to the open state. The high trip ratio preferably ranges from about 6 to about 28, preferably from about 14 to about 28 and is more preferably about 22. Accordingly, because the preferred fluid differential control valve can maintain a sealed state at a low gas pressure to control the flow of a relatively higher liquid pressure, and further trip open to the actuated state at an even lower pressure, the preferred control valve is well suited for use in a dry residential fire protection sprinkler system in which the gas pressure in the stand-by state is at a maximum 25 psi. and more preferably at a maximum of about 15 psi. and even more preferably no more than 14 psi. However, it should be understood that the preferred valve may be used in other applications such as, for example, non-residential dry pipe fire protection systems.

Figure 2:
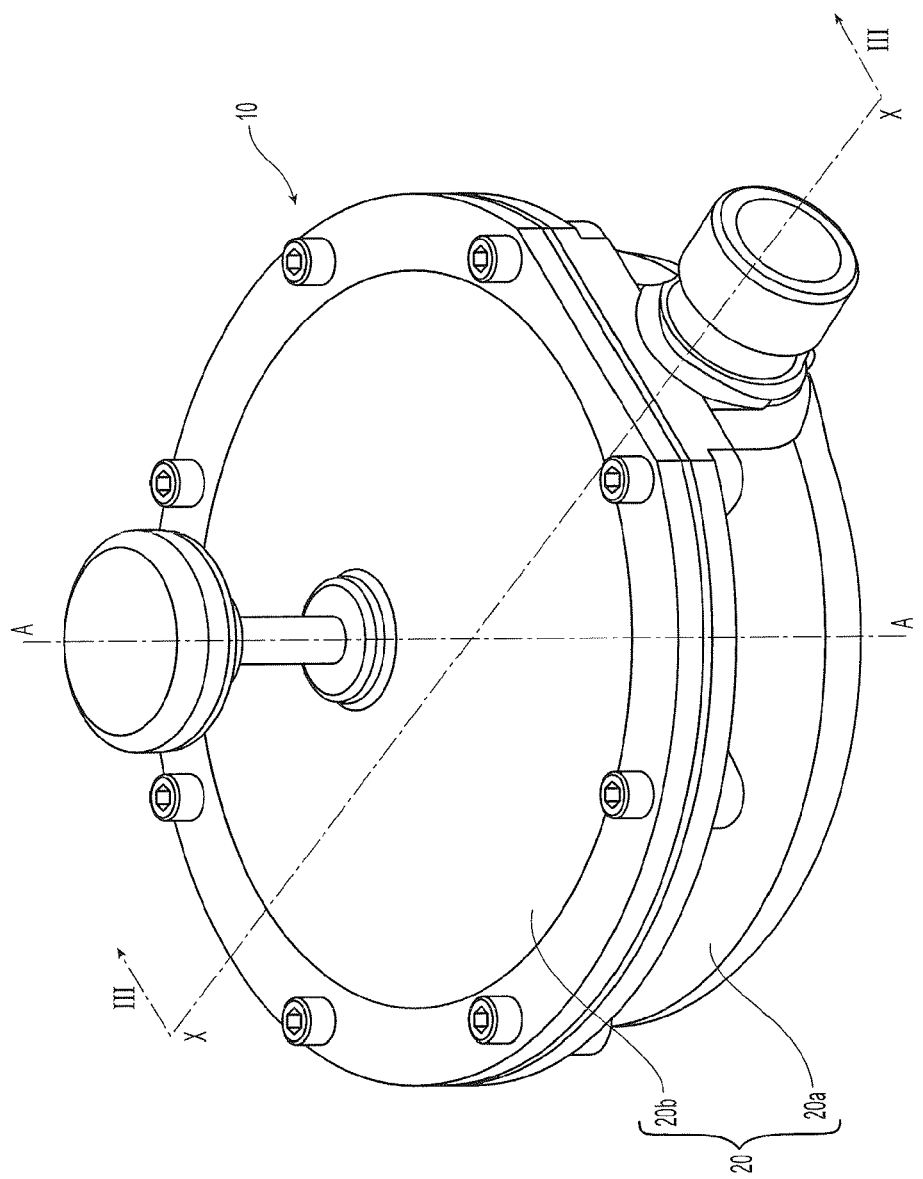
FIG. 2 is a perspective view of a preferred differential control valve for use in the system of FIG. 1.
Figure 2A:
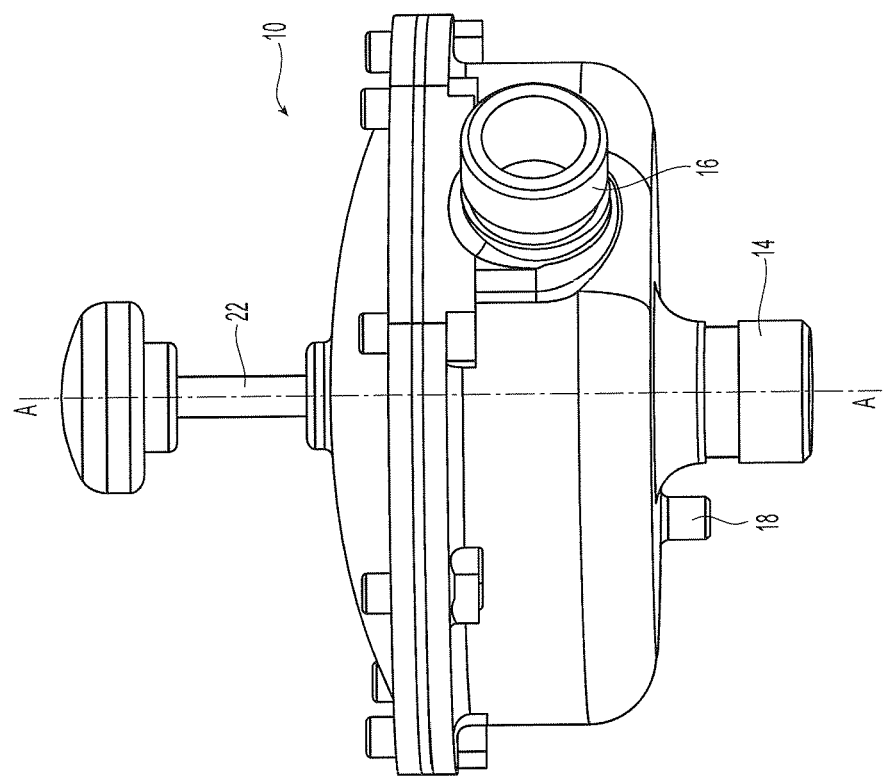
FIG. 2A is another perspective view of the valve of FIG. 2.

Shown in FIGS. 2 and 2A is one preferred embodiment of a differential control valve 10 for use in the previously described residential fire protection sprinkler system. The valve 10 includes a housing 20 preferably having a base or lower portion 20a and a cover or upper portion 20b which are preferably bolted together by a plurality of bolts or other fasteners radially arranged about the preferred mating flanges of the lower and upper portions 20a, 20b of the housing. The interface between the upper and lower portions 20a, 20b of the housing is preferably substantially circular defining a preferred diameter of about 6 in. However other dimension and/or configurations are possible. Preferably formed with the lower housing 20a are the inlet port 14, the outlet port 16 and the drain port 18. Shown preferably engaged with the upper portion 20b of the housing is a plunger member 22 disposed along a central axis A-A of the housing. The function of the plunger member 22 is explained in greater detail below.

Figure 3:
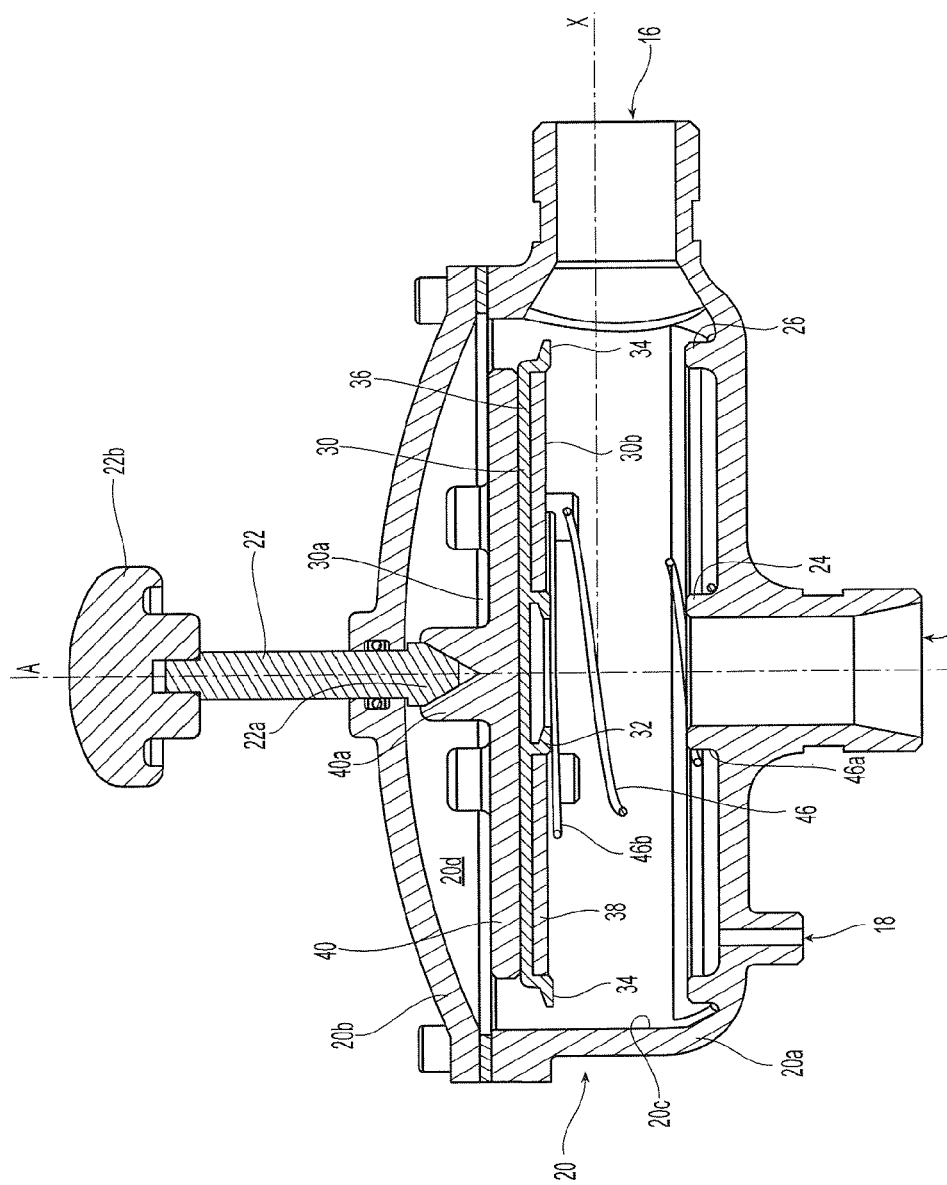
FIG. 3 is a cross-sectional view of the valve of FIG. 2 in an open state.
Figure 3A:
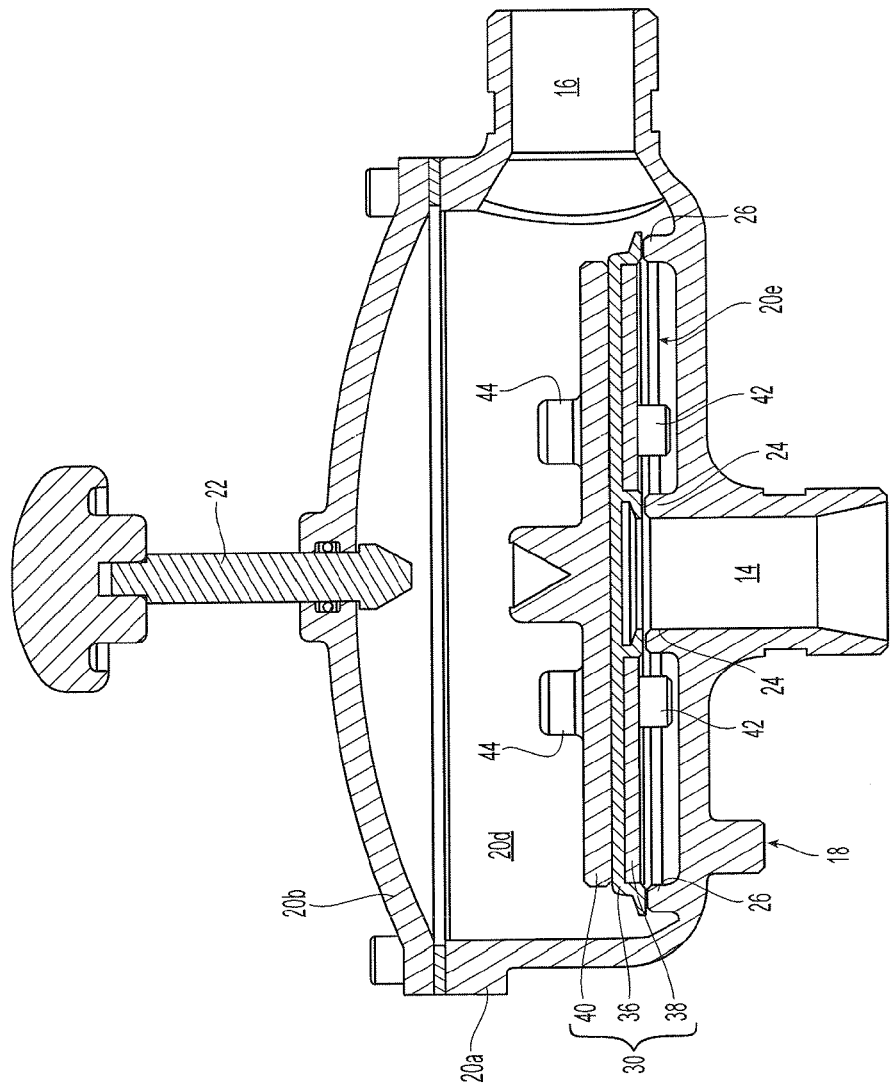
FIG. 3A is a cross-sectional view of the valve of FIG. 2 in a sealed state.
Figure 3B:
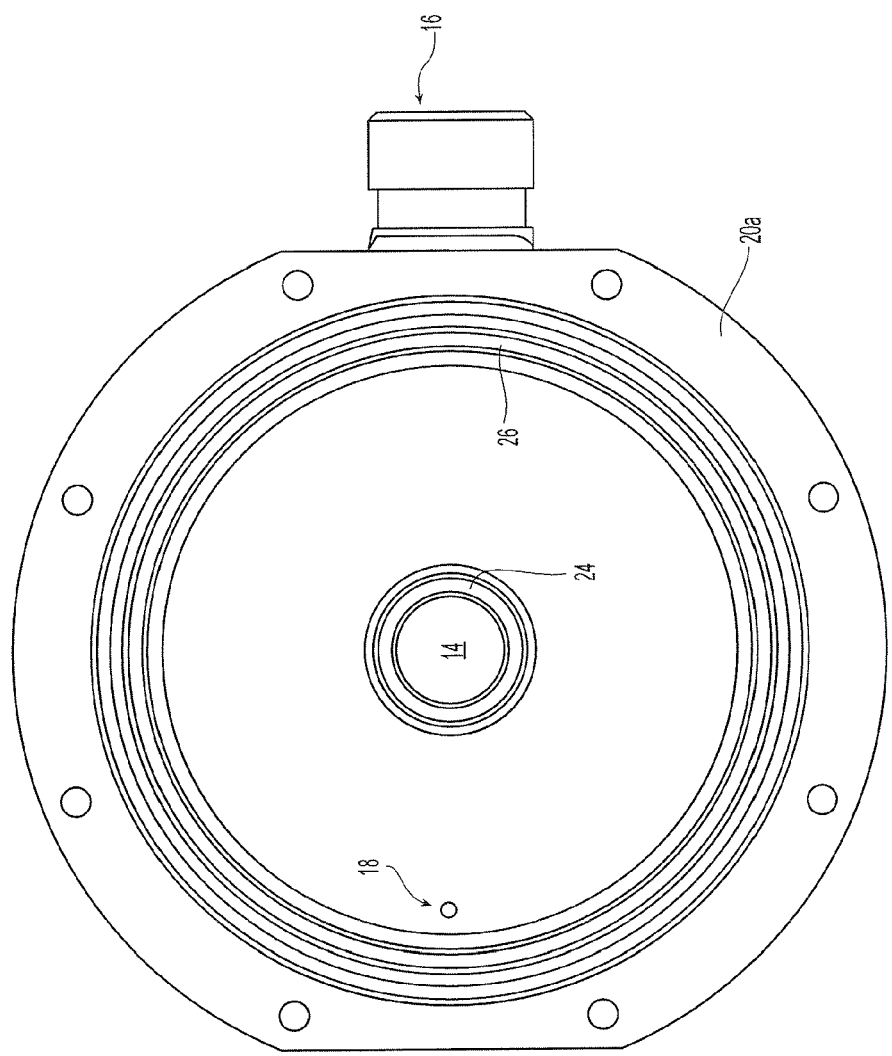
FIG. 3B is a plan view of the interior surface of the valve of FIG. 2.

Shown in FIG. 3 is a cross-sectional view of the preferred control valve 10. The upper and lower housings 20a, 20b cooperate together to form the interior surface 20c of the housing 20. The interior surface 20c further defines an internal chamber 20d of the housing being a preferably uniform volume about the central axis A-A. As seen in FIGS. 3 and 3B, a first fluid or liquid valve seat 24 is preferably formed along the interior surface 20c of the lower housing portion 20a and preferably centered or circumscribed about the central axis A-A of the housing proximate the inlet port 14. The liquid valve seat 24 preferably provides for a raised transition in the interior surface profile from the inlet port 14 to the internal chamber 20d of the valve 10. The liquid valve seat 24 is preferably circular and in one particular embodiment, preferably defines a seat diameter ranging from about ¾ inch to about 1 inch. The liquid valve seat 24 may define alternate geometries such as a square, rectangular or other polygonal shape. The liquid valve seat 24 further defines a first fluid or liquid sealing surface area to be sealed when the valve is in the sealed state to prevent fluid at the inlet port 14 from flowing to the outlet port 16. More specifically, the liquid sealing surface of the liquid valve seat 24 is the planar surface area projection defined by the seat 24 to be sealed that is preferably perpendicular to the axis of flow or central axis A-A. The liquid sealing surface defined by the liquid valve seat 24 preferably ranges from about 0.4 square inches to about 0.8 square inches.

Also preferably formed along the interior surface of the lower housing portion 20a is a second fluid or gas valve seat 26 which preferably surrounds and is more preferably centered about the liquid valve seat 24. The gas valve seat 26 further defines a second fluid or preferably gas sealing surface area to be sealed to maintain the gas pressure for placing the control valve in the sealed state. More specifically, the gas sealing surface of the gas valve seat 26 is the planar surface area projection defined by the gas seat 26 that is preferably perpendicular to the axis of flow or central axis A-A. As shown in FIG. 3B, the gas valve seat 26 is preferably circular and in one particular embodiment, preferably defines a seat diameter of about five inches (5 in.). The gas valve seat 26 may define alternate geometries such as a square, rectangular or other polygonal shape. The gas sealing surface defined by the gas valve seat 26 is preferably about twenty square inches (20 sq. inches) but may be alternatively sized to provide for the desired differential or ratio between the liquid pressure and the minimum gas sealing pressure as described herein. For the preferred valve arrangement, the ratio of gas sealing surface area to liquid sealing surface area to be sealed is preferable about 25:1. The sealing surface areas may vary provided that the valve maintains the preferred trip ratio as described herein below with respect to Table 3 of about 14:1 to about 22:1.

Shown in fluid communication with the internal chamber 20d are the preferred first through third ports 14, 16 and 18. In the preferred embodiment of the valve 10, the inlet port is preferably axially aligned with the central axis A-A of the internal chamber of the housing 20 so as to define an inlet axis of flow that is centered with respect to the internal chamber of the valve 10. The drain port 18 is preferably formed between the first and second valve seat. The outlet port 16 defines an outlet axis X-X that is preferably orthogonal to the central axis A-A of the housing. Accordingly, the outlet port 16 is preferably substantially orthogonal to the inlet port 14.

Figure 4:
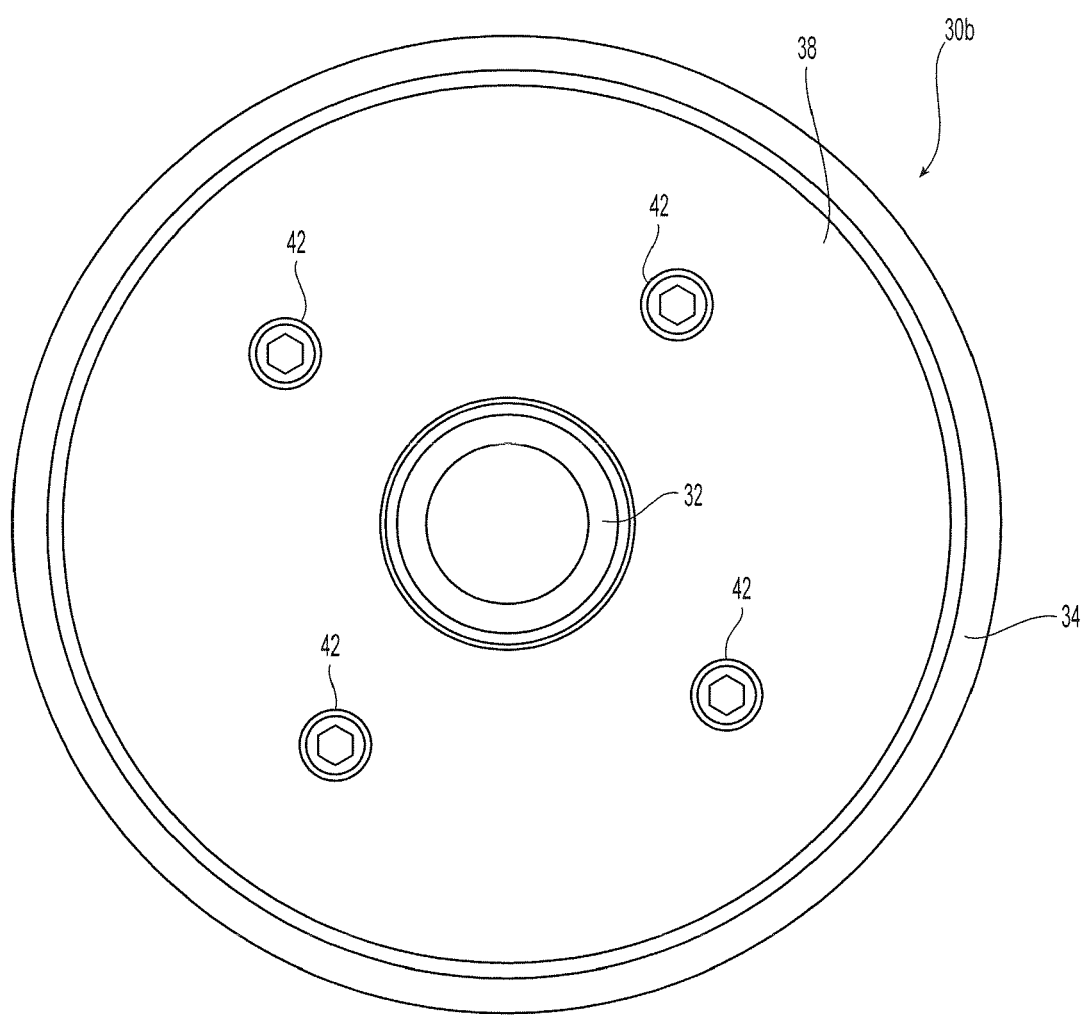
FIG. 4 is a plan view of a preferred sealing member for use in the valve of FIG. 2.

To seal each of the liquid and gas sealing surface areas, the control valve 10 includes a clapper assembly or sealing member 30 that is disposed within the internal chamber 20d. The sealing member 30 is a preferably substantially flat cylindrical assembly, element or plate that engages each of the liquid valve seat 24 and gas valve seat 26 in the sealed state of the valve, as seen in FIG. 3A, to form a fluid tight seal. In the sealed position, the sealing member 30 partitions the interior chamber to define a preferred annular sub-volume 20e of the chamber 20d that is in communication with the drain port 18. The drain port 18 is in communication with the annular sub-volume of the chamber 20d to provide a neutral volume of the valve 10 that is preferably exposed to atmosphere. The annular sub-volume and drain port 18 provide a vent for any build up of liquid or gas pressure to permit that valve 10 to seal. Referring to FIGS. 3 and 3a, as disposed in the internal chamber 20d, the sealing element 30 has a first proximal side 30a and an opposite second distal side 30b which faces and engages each of the liquid and gas valve seats 24, 26. Accordingly, the sealing surface 30b preferably includes a first fluid or liquid sealing surface portion 32 and a second fluid or gas sealing portion 34. Each of the liquid and gas sealing portions 32, 34 are configured to engage the corresponding liquid and gas valve seat 24, 26 so as to each form a fluid tight seal. Accordingly, each sealing portion 32, 34 has a preferred geometry that corresponds to that of the valve seat to be engaged. Referring to FIG. 4 and the preferred sealing member 30, the liquid sealing portion 32 is preferably circular with a diameter ranging from about ¾ inch to about 1 inch. The gas sealing portion 34 is preferably circular defining a preferred diameter of about 5 inches, centered about and circumscribing the liquid sealing portion 32. In the cross-section of FIGS. 3 and 3A, each of the sealing portions 32, 34 define in cross-section a preferably triangular or wedge-type geometry to facilitate the sealed engagement with the liquid and gas valve seats under the gas pressure applied to the proximal side 30a of the sealing element 30 when in the sealed state. More specifically, the sealing portions 32, 34 of the sealing element 30 preferably includes self-sealing, self-aligning flexible cantilevered lips as shown and described, for example, in U.S. Pat. No. 7,814,983 at column 5, line 63 to column 6, line 16, and FIGS. 18 and 19, which is incorporated by reference. Moreover, each of the liquid and gas sealing portions 32, 34 are preferably integrally or unitarily formed as part of a single flexible sealing gasket 36.

Figure 4A:
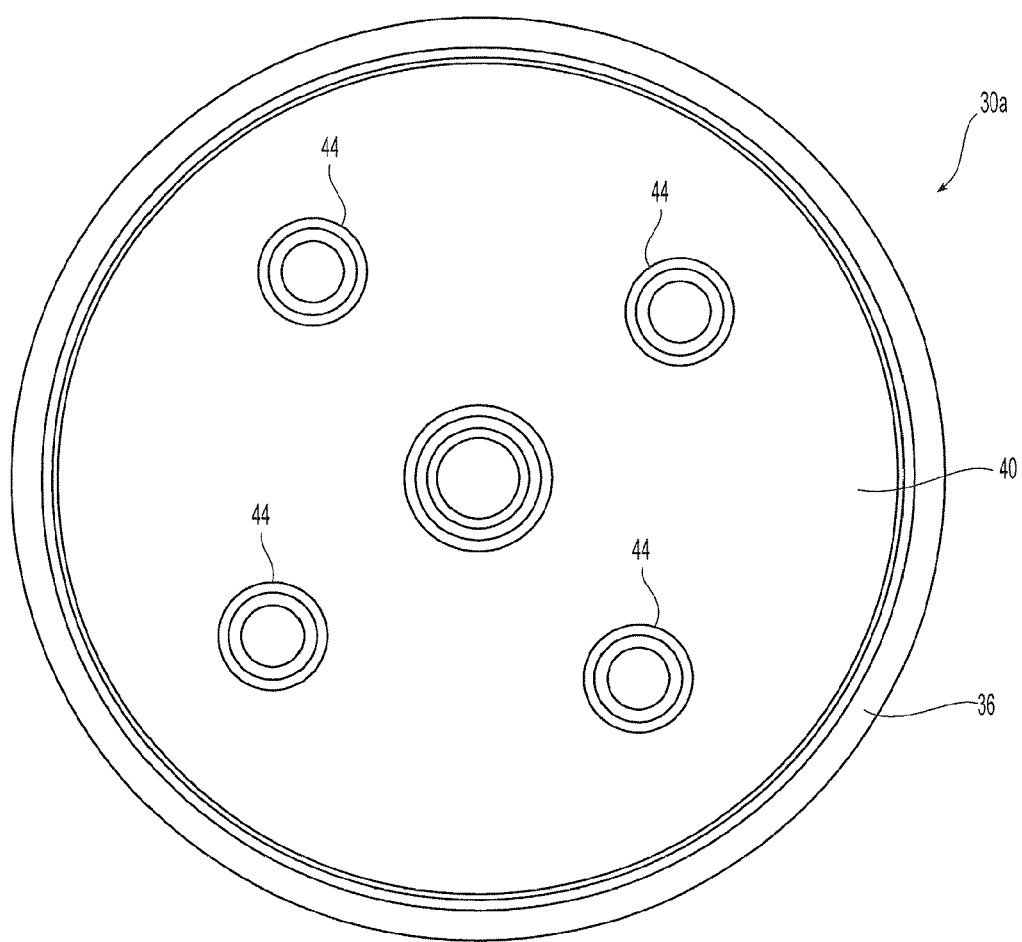
FIG. 4A is another plan view of a preferred sealing member for use in the valve of FIG. 2.

To support the gasket 36, the clapper or sealing member 30 is preferably an assembly in which the gasket 36 is disposed between a first distal plate 38 and a second proximal plate 40. Referring to the plan views of FIGS. 4 and 4A, the first plate 38 is preferably a substantially annular plate with the liquid sealing portion 32 disposed in the center of the annular plate such that the first plate 38 is located between the liquid sealing portion 32 and the gas sealing portion 38 of the sealing element. Referring to FIG. 4A, the upper or proximal plate 38 is preferably circular having diameter slightly less than that of the maximum diameter defined by the gas sealing portion 34. Alternatively, the upper plate 38 can be any geometry provided the plate provides sufficient support to the sealing element assembly 30 to form the effective seal in the sealed state.

Figure 4B:
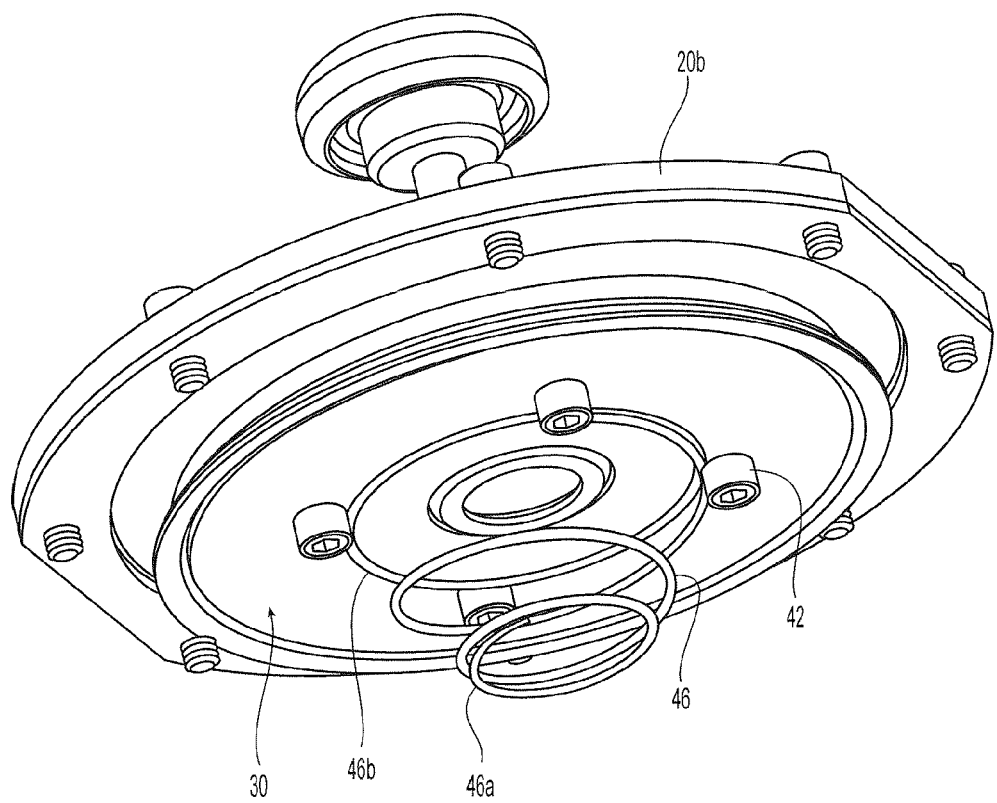
FIG. 4B is perspective view of a portion of the valve of FIG. 2.

To secure the sealing element or clapper assembly together the plates 38, 40 are coupled together by one or more fasteners 42. As seen in FIGS. 3A, 4, and 4B the fasteners 42 are preferably threaded hex screws extending through the first plate 38 and threaded into correspondingly threaded bores 44 formed in the second plate 40. Alternatively, the assembly 30 can be held together by other known fastening techniques so as to provide sufficient to support the gasket and formation of the seal under fluid pressure.

The preferred differential fluid control valve 10 is biased in the open state. In the preferred valve arrangement, the valve includes a spring member 46 to bias the sealing element 30 in the open position spaced from the liquid and gas valve seats 24, 26. The spring member 46 is preferably a coil spring having one end of the spring 46 engaged with the interior surface 20c of the valve housing and another end engaged with the sealing member 30. In the preferred embodiment of shown in FIGS. 3 and 4B, the spring member 46 is a single coil spring axially aligned and centered along the valve center axis A-A and the axis of flow. Accordingly, the preferred coil 46 spring has its first end 46a preferably disposed about the liquid valve seat 24 and its second end 46b engaged with the distal surface 30b of the seal element 30 facing the valve seats 24, 26. In such a preferred arrangement, the spring member 46 defines a first length with the sealing member in the sealed position; and defines a second length greater than the first length when the sealing member is in the open position. The second end 46b of the spring preferably defines a greater diameter than the first end 46a such that the spring 46 tapers narrowly in the direction from the sealing element to the liquid valve seat 24. In one preferred embodiment the first spring end 46a defines a diameter of about one inch to about 1.5 inch (1-1.5 in.) and the second spring end 46b defines a second diameter of about 2.5-2.75 inches with a free length that ranges from about 1.25-1.5 inches. The tapered spring 46 defines a minimum compression axial length so as to minimize the volume requirement to house the spring 46 in the neutral sub-volume of the chamber 20, as seen for example in FIG. 3A (spring not shown), in the sealed configuration of the valve 10.

Figure 6:
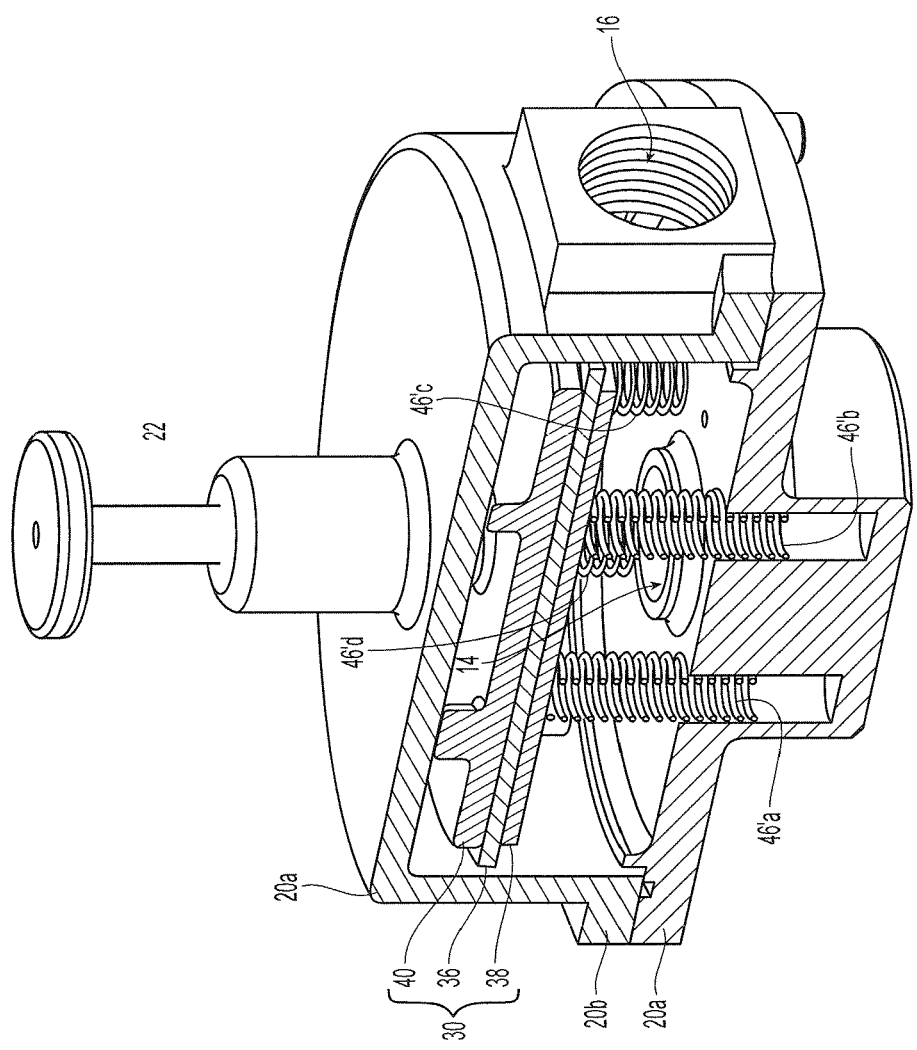
FIG. 6 is a cross-sectional view of another preferred differential control valve for use in the system of FIG. 1.

Generally, the preferred differential fluid control valve arrangement provides for normally or biased open seal valve in which the sealing element or member of the valve is biased toward the open position by a spring member disposed between the sealing element and the valve seats for the sealing element. Alternative arrangements are possible provided the valve sealing element is biased toward the open state and axially spaced away from the valve seats. For example, instead of a single spring member 46 centered about the liquid valve seat 24, the spring member may include a plurality of springs arranged between the distal surface of the sealing element and the interior surface 20c of the valve housing between the liquid valve seat 24 and the gas valve seat 26. Such an arrangement is shown for example in FIG. 6. As seen in FIG. 6, the spring member(s) 46 can be non-tapered and the valve 10 can include recesses in the 20a to house the spring member 46. Providing a recess(es) in the housing 20 provides the space to accommodate the non-tapered spring member 46 in its compressed state so that the neutral sub-volume of the chamber 20d can be minimized. Another alternative may provide that the single spring member 46 surrounds and is centered about the larger gas valve seat 26. Accordingly, the spring member may taper narrowly in a direction from the valve seat to the sealing member. Further in the alternative, the spring member or members may be disposed so as to engage other surfaces of the sealing element 30 and/or the valve so long as the sealing element 30 is biased toward the open state. For example, the spring member 46 may appropriately bias the sealing member 30 toward the open state by engaging the proximal side 30a of the sealing member. Accordingly, in such an arrangement, the spring member 46 would define a first length with the sealing member in the sealed position; and defines a second length less than the first length when the sealing member is in the open position.

In order to locate the normally spaced sealing element 30 against the valve seats 24, 26, the valve 10 further preferably includes the elongate plunger member 22. The preferred plunger is centered along the valve axis A-A and for sliding engagement within an opening in the upper portion 20b of the valve housing. The opening in the housing may be sealed with an o-ring or other sealing material to ensure a fluid tight seal about the elongated plunger member 22. The plunger 22 preferably includes an enlarged first end 22a disposed within the internal chamber 20d of the valve. The enlarged end 22a engages a proximal portion of the sealing element 30, as seen for example in FIG. 3 and the plunger 22 can be translated axially by knob 22b to locate the sealing element in the seated state against the valve seats 24, 26 of the valve. With the sealing element seated, the internal chamber 20d valve 10 can be pressurized with a sufficient sealing pressure to maintain the valve in the sealed state. To facilitate the engagement between the plunger 22 and the sealing member 30, the proximal side 30a of the sealing member may include an engagement surface. For example, as seen in FIG. 3, the proximal plate 40 of the sealing assembly 30 includes a receptacle 40a that mates with the enlarged end portion 22a of the plunger 22 for cooperative engagement.

In the absence of a sufficient sealing pressure, the fluid pressure at the inlet port 14 and the biasing force of the spring preferably axially translate the sealing assembly 30 from the sealed state in FIG. 3A to the open state of FIG. 3. The peripheral edge of the sealing assembly 30 defines a preferred minimum annular gap or clearance with interior surface 20c of the housing 20 of about one inch. Due to the preferred arrangement of the liquid and gas valve seats 24, 26 and sealing assembly 30 in combination with the preferred spring member 46, the sealing assembly 30 remains substantially aligned with the central axis A-A in each of the sealed states and open states. In particular, the liquid sealing portion 32 and the gas sealing portion 34 of the sealing assembly 30 preferably substantially maintain the same orientation relative to the central axis A-A in each of the sealed states and open states. Accordingly, for the preferred valve 10, the sealing portions 32, 34 define geometries circumscribed and more preferably substantially centered about the central axis A-A in each of the sealed and open states. In addition or alternatively to, the seal member or assembly 30 defines substantially the same angular orientation with respect to the central axis A-A in each of the sealed and open states. For example, as seen in the sealed state of FIG. 3A and open state of FIG. 3, the sealing portions 32, 36 are disposed in axially spaced planes oriented perpendicular to the central axis A-A. It should be understood that the components of the valve 10 need not be exactly axially aligned or aligned in the same plane, but rather the components such as, for example, the valve seats 24, 26 or sealing portions 32,34 or portions thereof may be slightly off-center or skewed with respect to one another, provided the differential fluid control valve 10 properly forms a fluid seal and actuates to provide the desired fluid control using a high liquid to gas ratio in a manner as described herein.

Figure 3C:
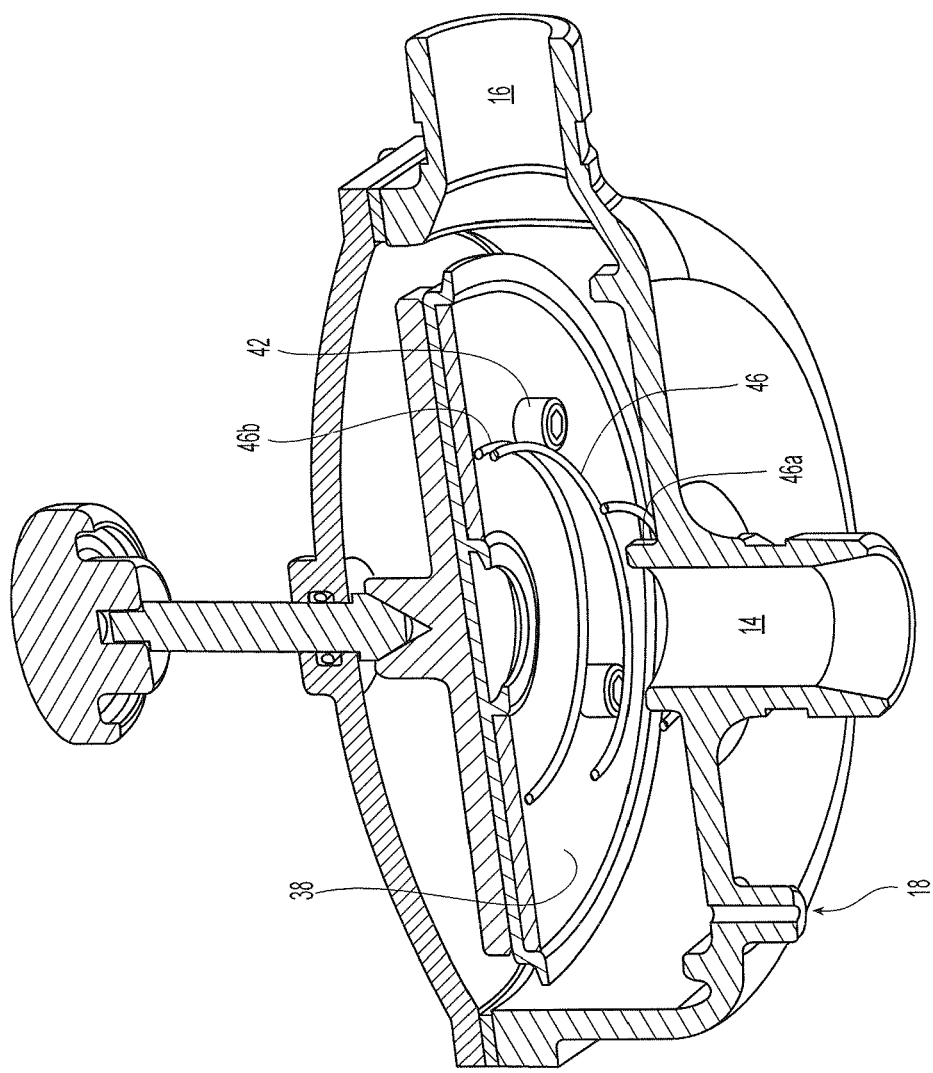
FIG. 3C is a cross-sectional perspective view of the valve of FIG. 2.

In the preferred arrangement of the valve 10 shown in FIGS. 3-3C, the sealing assembly 30 is supported and located in the open state by only the spring member 46 and its engagement with the projections or hex screws 42 or other portion of the sealing assembly 30. The preferred arrangement and orientation of the valve do not require that the sealing assembly 30 be fixed to the spring member 46 or any other valve structure. Relying on gravity and the frictional engagement between the assembly 30 and the spring member 46 renders the sealing assembly 30 essentially a "free-floating" clapper structure within internal chamber 20d the valve housing 20.

Figure 7:
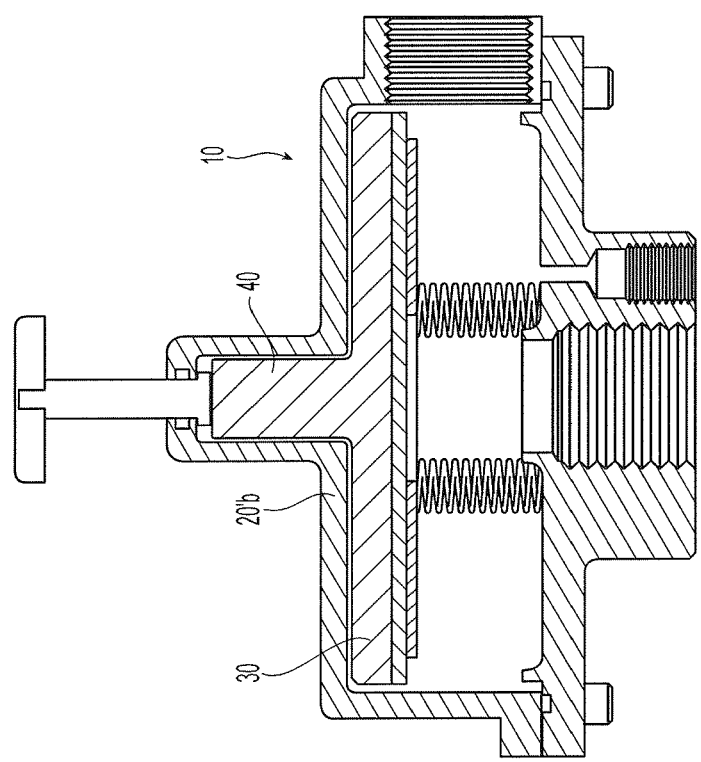
FIG. 7 shows another embodiment of another preferred differential control valve.

The differential fluid control valve 10 may be alternatively configured to provide for the desired orientation of the sealing assembly 30. More specifically, the valve 10 may include additional structure to support and locate the sealing assembly in the desired orientation. For example, the proximal surface of the sealing assembly 30 can include a projection for cooperative engagement with the upper housing portion 20a to maintain the desired orientation of the sealing assembly 30, as seen for example in FIG. 7.

As a control valve in the preferred residential fire sprinkler protection system 100, the preferred fluid differential control valve 10 is installed with the preferred inlet port 14 coupled to the upstream shut-off valve 12a by a T-fitting or other pipe fitting such that the central axis A-A of the valve 10 is vertically aligned with the main water supply pipe. The substantially orthogonal outlet port 16 of the valve is coupled to the main riser pipe of the residential sprinkler piping. With the upstream shut-off valve 12a closed, the plunger is depressed to translate and locate the sealing element 30 in the seated position against the liquid and gas valve seats. The preferred air compressor pressurizes the dry portion of the system to a preferred pressure ranging from greater than 10 psi to about 25 psi. or to a preferred range of 10 psi. to about 15 psi. With the valve 10 in fluid communication with the dry portion 100a of the system, the internal chamber is accordingly pressurized to the system pressure of 10 psi to about 25 psi.

To place the valve in stand-by service, the upstream shut-off valve is opened so as to deliver a water pressure ranging from about 10 psi. to about 180 psi. and more preferably from about 30 psi. to about 175 psi. to the inlet port 14 of the valve and against the liquid sealing portion 32 of the sealing element 30. For the preferred ¾ inch to one inch liquid valve seat, the gas pressure acts in opposition to both the liquid pressure and the bias of the spring member 46 so as to maintain the preferred five inch gas sealing portion 34 of the sealing element 30 against the correspondingly sized gas valve seat 26 so that the valve 10 and system 100 are in a stand-by state. Accordingly, the enlarged end 22a of the plunger 22 can be disengaged from the sealing element or clapper assembly 30 such that the valve 10 is maintained in the sealed state and the sprinkler system 100 is maintained in the stand-by state only by the gas pressure acting on the sealing element assembly 30.

Although the one inch liquid valve seat 24 and five inch gas valve seat are preferred dimensions for the differential fluid control valve 10, the valve may be appropriately scaled so as to provide for a different size of fluid inlet, outlet, liquid valve seat or gas valve seat to define a ratio of gas pressure to liquid pressure that maintains the valve and or system in the sealed and stand-by state. More specifically, the valve dimensions may be configured so as to provide the static condition of the sealed state in which the gas pressure alone can maintain the sealing assembly 30 in the sealed state against both the liquid pressure at the inlet and the biasing force of the spring member 46. Any scaling in the size of the components of the fluid differential control valve 10 preferably provide for the high liquid to gas sealing ratio as described herein.

For the preferred valve configuration, the static gas and liquid pressure relationship is defined by:

$$((D_{Gas\ Valve\ Seat})^2 \times \Pi/4) \times P_{Gas} = \text{Force}_{Spring}((D_{Liquid\ Valve\ Seat})^2 \times \Pi/4) \times P_{Liquid}) \text{ where}$$

$D_{Gas\ Valve\ Seat}$=Diameter of the Gas Valve Seat
$D_{Liquid\ Valve\ Seat}$=Diameter of the Liquid Valve Seat
$P_{Gas}$=Minimum Pressure of Gas required for sealed state of valve (Minimum sealing gas pressure)
$P_{Liquid}$=Pressure of Liquid at the inlet port of the valve
$\text{Force}_{Spring}$=Total spring force acting against the sealing assembly 30.

From the stand-by state of the system, the system 100 may be actuated by the loss of system gas pressure due to an actuated residential sprinkler 118. Eventually, the system gas pressure is reduced below the minimum sealing gas pressure such that the valve 10 is tripped or actuated from the sealed state to the actuated or open state. Under the incoming liquid pressure and the force of the spring member 46, the sealing assembly 30 is translated to the open state and liquid is permitted to flow from the inlet port 14 of the valve and out the outlet port 16 of the valve for delivery to the actuated sprinklers 118 of the residential sprinkler piping 110.

In view of the above, the trip or actuating gas pressure is less than the minimum sealing gas pressure and therefore is also a function of the liquid inlet pressure and spring force. The preferred differential fluid control valve was tested for a range of inlet water pressures ranging from 30 psi. to 175 psi. and a total spring force Force$_{Spring}$ of about 17 pounds-force (lbs.-f) using four springs to identify the gas or air pressure at which the valve would trip or actuate. FIG. 6 schematically shows the test valve arrangement. The results are summarized below:

TABLE 1

| WATER PRESSURE @ TRIP (P.S.I) | AIR PRESSURE @ TRIP (P.S.I) | TRIP RATIO TESTED |
|---|---|---|
| 29 | 5 | 5.8 |
| 40 | 4 | 10 |
| 60 | 6 | 10 |
| 80 | 6.5 | 12.3 |
| 100 | 9.0 | 11.1 |
| 120 | 9.0 | 13.3 |
| 140 | 10 | 14 |
| 160 | 12 | 13.3 |
| 175 | 14 | 12.5 |

5 in. Gas Valve Seat; 1 in. inlet and Total Spring Force of about 17 Lbs.-f (using 4 springs).

Accordingly, a trip ratio was determined for a given water inlet pressure and compressed air trip pressure. Under the test, the trip ratio was determined to range from about 6 to about 13. Another embodiment of the preferred differential control valve was tested in which the liquid valve seat 24 diameter is about ¾ inch, the gas valve seat diameter is about 5 inches and the total spring force Force$_{Spring}$ of about 17 Lbs-f.

TABLE 2

| WATER PRESSURE @ TRIP (P.S.I) | AIR PRESSURE @ TRIP (P.S.I) | TRIP RATIO TESTED |
|---|---|---|
| 30 | 2.5 | 12 |
| 40 | 3 | 13.3 |
| 60 | 4 | 15 |
| 80 | 5 | 16 |
| 100 | 6 | 16.6 |
| 120 | 6 | 20 |
| 140 | 6.5 | 21.5 |
| 160 | 7.5 | 21.3 |
| 180 | 8.0 | 22.5 |

5 in. Gas Valve Seat; ¾ in. inlet and Total Spring Force of about 17 Lbs.-f (using 4 springs).

Under the test, the trip ratio was determined to range from about 12 to about 23. The inventor has also identified a preferred range of trip ratios from about 14 to about 28. Table 3 below shows the theoretical or preferred gas trip pressure and resultant trip ratio for a given range of water inlet pressures. For the preferred pressure values, the valve has a preferred liquid valve seat diameter of one inch, a gas valve seat diameter of five inches and a total spring force Force$_{Spring}$ of about 17 Lbs.-f.

TABLE 3

| WATER PRESSURE @ TRIP (P.S.I) | AIR PRESSURE @ TRIP (P.S.I) | TRIP RATIO |
|---|---|---|
| 30 | 2.06 | 14.6 |
| 40 | 2.46 | 16.3 |
| 60 | 3.26 | 18.4 |
| 80 | 4.06 | 19.7 |
| 100 | 4.86 | 20.57 |
| 120 | 5.66 | 21.2 |
| 140 | 6.46 | 21.6 |
| 160 | 7.26 | 22.0 |
| 175 | 7.86 | 22.2 |

5 in. Gas Valve Seat; 1 in. inlet and Total Spring Force of about 17 Lbs.-F.

The preferred range of trip ratios is considered to be a high differential ratio, i.e., greater than 6. It is anticipated that for residential systems, the water pressure to the control valve would be a maximum of about 180 psi. Accordingly, the range of gas trip pressures ranges from about 2 psi. to about 15 psi. and more preferably range from about 2 psi. to about 8 psi. Thus, the preferred differential fluid control valve is maintained in the closed or sealed state by a minimum gas or air pressure of about 8 psi. to about 16 psi. More preferably, the sealed state is maintained by a minimum sealing gas pressure which ranges from about 8 psi. to about 14 psi, and even more preferably range from about 10 psi. to about 14 psi.

An alternate embodiment of the preferred valve was tested in which the total spring force Force$_{Spring}$ was reduced to 8.5 Lbs.-f. Table 4 below shows that a reduction in the total spring force Force$_{Spring}$ reduced the gas trip pressure and increased the trip ratio at the lower end of the water pressures and at the higher end water pressures.

TABLE 4

| WATER PRESSURE @ TRIP (P.S.I) | AIR PRESSURE @ TRIP (P.S.I) | TRIP RATIO TESTED |
|---|---|---|
| 30 | 3 | 10 |
| 40 | 4 | 10 |
| 60 | 6 | 10 |
| 80 | 6.5 | 12.3 |
| 100 | 9.0 | 11.1 |
| 120 | 9.0 | 13.3 |
| 140 | 10 | 14 |
| 160 | 11 | 14.5 |
| 175 | 13 | 13.4 |

5 in. Gas Valve Seat; 1 in. inlet and Total Spring Force of about 8.5 Lbs.-f (using 2 springs).

Because the preferred control valve 10 can be maintained in the sealed state by such low pressures, the valve is well suited for use in residential dry sprinkler fire protection systems. Moreover, the low gas sealing pressures permit the preferred fluid control valve to be used in a residential fire protection sprinkler system that includes plastic PVC piping or fittings preferably rated for use in residential fire protection systems and more preferably for use in residential dry sprinkler piping systems, as seen for example, in U.S. Patent Publication No. 2006/0021765, which is incorporated by reference. It is preferred that the system gas pressures for residential fire protections systems employing plastic piping not exceed 14 psi. Moreover, the preferred range of sealing gas pressure provide for a sealing pressure of less than 6 psi. which can effectively maintain the valve in the sealed state for at least a range of inlet liquid pressures.

As discussed above, the spring member 46 disposed in the control valve 10 biases the sealing or clapper assembly 30 in the open state. In addition, the spring prevents the sealing assembly 30 from re-seating itself into the sealed state under a back flow pressure of water in the residential sprinkler piping 110 of the actuated system for any possible fluctuations in pressure of the fluid supply.

Figure 5:
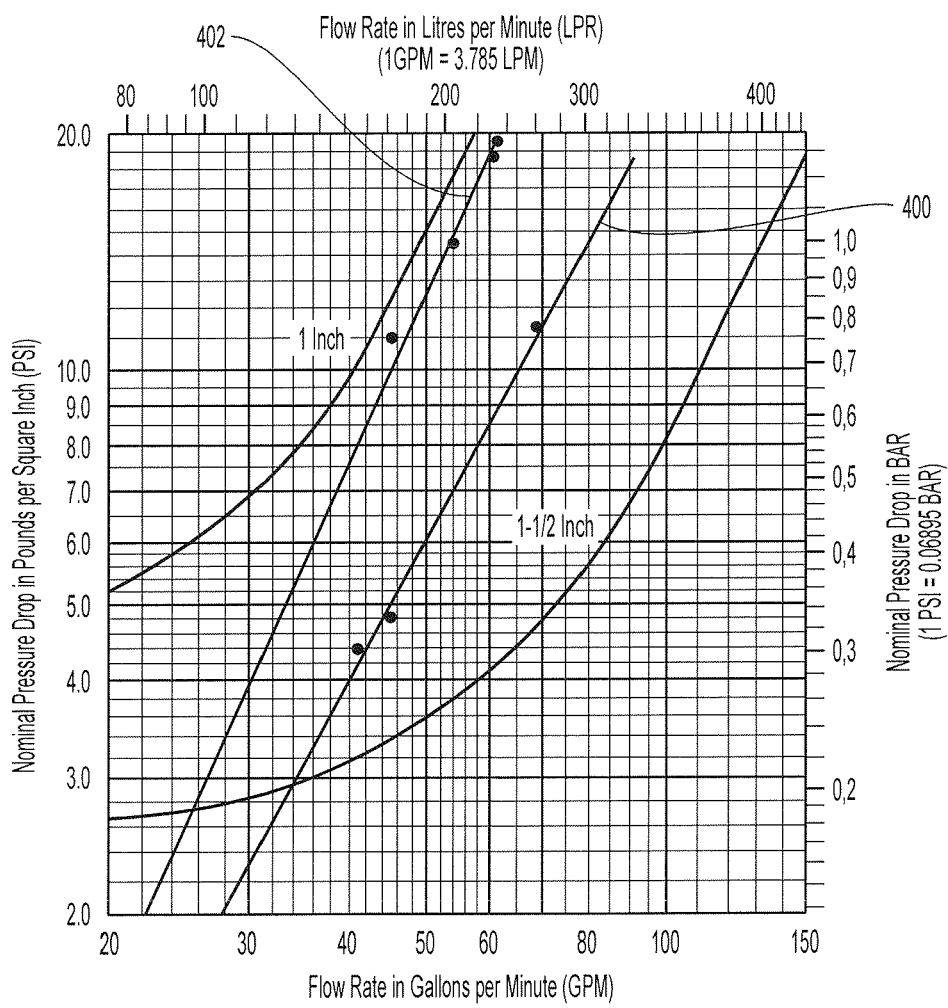
FIG. 5 is a head loss profile of two embodiments of the preferred valve.

In addition to the trip ratio performance, the above configuration of the preferred differential fluid control valve 10 in the open or actuated state provides for the desired fluid pressure drop across the valve for a range of flow rates through the valve. Shown in FIG. 5 is a preferred chart having a first pressure drop profile 400 for the valve 10 having a one inch liquid valve seat and a second pressure drop profile 402 for the valve 10 having a ¾ inch liquid valve seat. Each of the preferred pressure drop profiles 400, 402 are preferably linear, and as compared to a known one inch solenoid valve, the preferred one inch fluid differential control valve experiences a lower pressure drop for the same flow rate through the valve. For liquid flowing through the preferred valve 10, a pressure drop across the valve preferably ranges from about 2 psi. to about 20 psi. for the liquid flow from the outlet ranging from 20 gpm to about 80 gpm; and more preferably, the fluid experiences a pressure drop across the valve of no more than 3 psi. for a flow rate of 40 gpm, (equivalent to flow rate of 15 feet per second from a 1 inch pipe).

As discussed above, the spring member 46 biases the clapper assembly 30 in the open state. For one particular embodiment of the spring member 46 the total spring force provided by the member 46 was identified to range from about 8 Lbs.-f to about 17 Lbs.-f. However, it should be understood that the spring member 46 can be configured in various ways such that the valve 10 can properly seal and operate in a desired manner as described herein. In particular, the spring member 46 should provide a minimum spring force sufficient to axially extend the clapper assembly 30 to the fully open position under only the weight of the clapper assembly 30 and in the absence of either a sealing gas pressure or liquid supply pressure. One preferred embodiment of the clapper assembly 30 weighs about two pounds (2 lbs.). Moreover, the spring member 46 is preferably configured so as to provide the valve 10 with the desired trip ratio ranging from 6 to 28 even in the presence of a minimum amount of water or liquid pressure, while at the same time, permitting the valve to seal under a sealing gas pressure ranging from about 8 to about 14 psi. Finally, the spring member 46 can be further configured so as to locate the clapper assembly 30 in the fully open position such that liquid flow through the valve 10 experiences a minimized pressure drop of no more than 3 psi.

While the present invention has been disclosed with reference to certain embodiments, numerous modifications, alterations, and changes to the described embodiments are possible without departing from the sphere and scope of the present invention. Moreover, to the extent any features are claimed or described with an approximated numerical value or range of values, it should be understood that such approximated numerical value or range encompasses the stated numeral or numerical range along with a variability and/or tolerance that is to be expected for the described or claimed parameter, yet sufficiently specific to define the sphere and scope of the present invention as a whole. Accordingly, it is intended that the present invention not be limited to the described embodiments, but that it has the full scope defined by the language of the following claims, and equivalents thereof.

What is claimed is:

1. A differential control valve comprising:
   a housing having an interior surface defining an internal chamber with a central axis;
   a first valve seat disposed along the interior surface of the housing circumscribed about the central axis;
   a second valve seat disposed along the interior surface disposed and circumscribed about the first valve seat;
   a seal member defining a sealed position engaged with the first valve seat and the second valve seat under a sealing pressure of a gas in the internal chamber, the seal member further defining an open position with the distal surface axially spaced from the first and second valve seats upon release of the sealing pressure of the gas from the internal chamber, the seal member being substantially aligned with the central axis of the housing in each of the sealed and open positions;
   a first port proximate the first valve seat in communication with the internal chamber, and a second port in communication with the internal chamber, the second port being isolated from the first port when the seal member is in the sealed position and in fluid communication with the first port when the seal member is in the open position;
   at least one spring member disposed in the internal chamber of the housing and engaged with the seal member to bias and support the seal member in the open position upon release of the sealing pressure of the gas from the internal chamber; and
   a plunger member to locate the seal member from the open position to a seated position against the first and second valve seats, the plunger being spaced from the seal member upon the seal member being placed in the sealed position.

2. The control valve of claim 1, wherein the at least one spring member has a first length in the sealed position and a second length in the open position, the second length being greater than the first length.

3. The control valve of claim 1, wherein the at least one spring member has a first length in the sealed position and a second length in the open position, the second length being less than the first length.

4. The control valve of claim 1, wherein the at least one spring member is at least one of:
   (a) tapered;
   (b) defines a total spring force ranging from about 8 to about 17 pounds-force (Lbs.-f); and
   (c) includes a plurality of coil springs.

5. The control valve of claim 1, further comprising a third port between the first and second valve seats, wherein when the seal member is in the sealed position, the seal member and the first and second valve seats define an annular void with the third port being in communication with the annular void.

6. The control valve of claim 1, wherein the seal member comprises a plurality of axially extending projections engaged with the at least one spring member to locate a portion of the at least one spring member along a surface of the seal member.

7. The control valve of claim 1, wherein the seal member comprises a cylindrical member, having a first side opposed to the first and second valve seats and a second side opposite the first side;
   wherein the seal member includes a first plate and second plate, the second plate includes an element to center the seal member along the central axis; and
   wherein the element of the second plate comprises a projection, the projection extending axially along the central axis to cooperate with the valve housing.

8. The control valve of claim 1, wherein the seal member includes a first plate and a second plate, the seal member comprises a cylindrical member, having a first side opposed to the first and second valve seats and a second side opposed to the first side;

wherein the second plate includes an element to center the seal member along the flow axis; and wherein the plunger member is engaged with the housing so as to have a portion disposed in the internal chamber, the second plate including a receptacle for receiving the portion of the plunger to locate the seal member in the seated position.

9. The control valve of claim 1, wherein the at least one spring member is located between the first and second valve seats.

10. The control valve of claim 9, wherein the at least one spring member comprises a coil spring having a first end engaged with the interior surface about the first valve seat and a second end engaged with a surface of the seal member that is opposed to the first valve seat, the coil spring tapering narrowly from the second end to the first end.

11. The control valve of claim 9, wherein the at least one spring member comprises at least one coil spring having a first end engaged with a portion of the interior surface of the valve that includes the first valve seat, the coil spring having a second end engaged with a portion of the seal member that faces the first valve seat.

12. The control valve of claim 11, wherein the at least one coil spring comprises a plurality of coil springs.

* * * * *